United States Patent
Mullaney

[15] 3,691,897
[45] Sept. 19, 1972

[54] TORQUE LIMITING NUT

[72] Inventor: Jerry Allen Mullaney, Chicago, Ill. 60631

[73] Assignee: Illinois Tool Works Inc., Chicago, Ill.

[22] Filed: March 31, 1971

[21] Appl. No.: 129,733

[52] U.S. Cl. ...................................85/62, 151/37
[51] Int. Cl. .........................F16b 31/02, F16b 39/26
[58] Field of Search ......85/62, 61, 45, 9, 32 V, 32 R; 151/21 R, 21 C, 37; 81/52.4 R, 53.2, 90 B, 124.1

[56] References Cited

UNITED STATES PATENTS 2,745,303  5/1956  Cornelius..................85/61 X

Primary Examiner—Ramon S. Britts
Attorney—Robert W. Beart, Jack R. Halvorsen, Thomas W. Buckman and Edward L. Benno

[57] ABSTRACT

A rotary nut member including an aperture with internal threads and external wrenching surfaces adapted to accept torque from an axially positioned driver. Spring legs extend from the body portion of the nut to engage the driver and force it upwardly out of contact with the wrenching surfaces when the nut reaches a predetermined tension.

10 Claims, 5 Drawing Figures

PATENTED SEP 19 1972 3,691,897
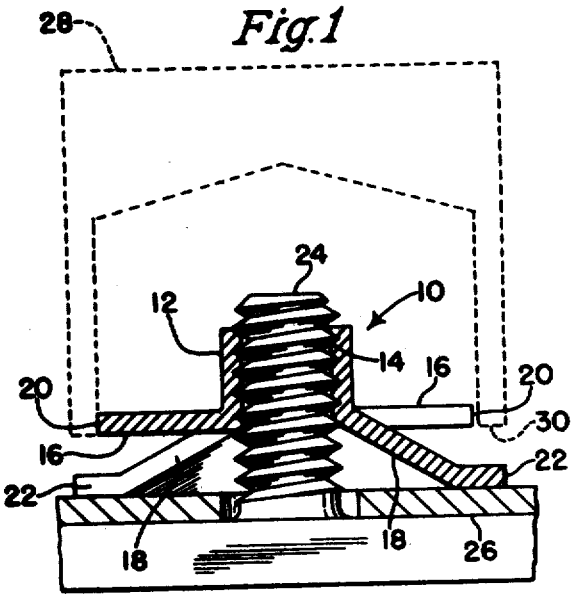
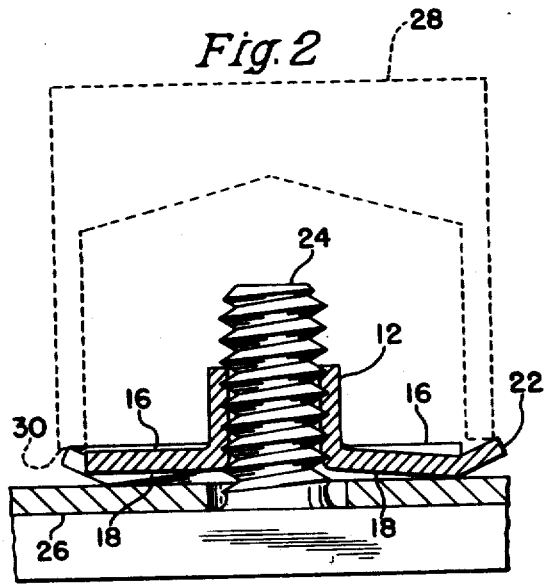
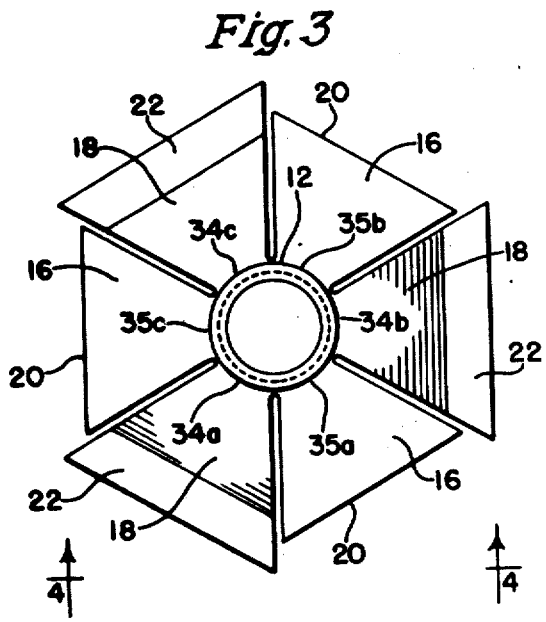
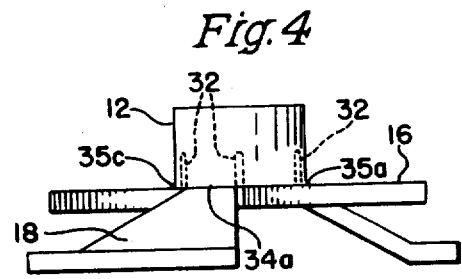
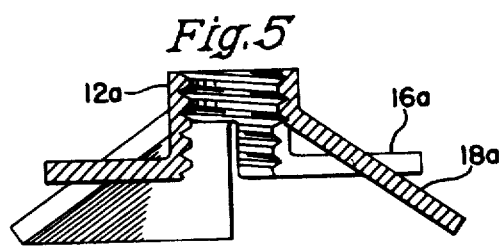
INVENTOR.
Jerry A. Mullaney
BY
His Att'ys

TORQUE LIMITING NUT

BACKGROUND OF THE INVENTION

This invention relates to the problem of tightening a nut on a bolt or the like in such a manner as to insure a predetermined tension on the nut. Presently, attempts at the solution of this problem have either utilized a visual indicating means or frangible elements in the nut itself which are adapted to break or deform in such a manner as to indicate that a certain tension has been reached.

These previous efforts have the decided disadvantage of necessitating a positive action on the part of the operator of the nut driver or the use of a driver having an automatic clutch release system.

Other torque limiting nuts have utilized a two or more piece nut member which is designed to disengage a nut from a bolt when a predetermined tension has been reached. This type of device lacks a constant tension between the nut and bolt throughout all stages of its application. A multiple piece member also is costly to produce and use.

SUMMARY OF THE INVENTION

It is an object of this invention to provide a rotary nut member which is capable of positively disassociating a nut runner or driver from the nut upon attaining a predetermined tension.

It is a further object of this invention to provide a one-piece stamped nut with the ability to provide tension and insure against overtorquing of the fastener joint.

Yet another object of the present invention is to provide a nut which reaches a predetermined tension and indicates this state independent of purely visual means.

It is yet another object of this invention to provide a nut member which will achieve a predetermined tension without necessitating human judgement or special tools.

Still another object of this invention is to provide a one-piece device which limits torque applied to a fastening joint while providing a prevailing torque condition to the fastening joint.

These and other objects and advantages of the present invention are obtained by the nut member of the present invention which preferably includes a cylindrical body portion with alternately positioned arms and spring legs extending outwardly therefrom and positioned adjacent the lower extremity of the cylindrical body. The spring legs are constructed to distend outwardly as rotary force moves the nut member axially on an associated screw member. The distention of the spring legs will ultimately bring at least a portion of these legs co-planar with the wrenching surfaces of the arms. When this state is reached, a driver is forced upwardly out of contact with the wrenching surfaces.

BRIEF DESCRIPTION OF THE DRAWINGS

FIG. 1 is a part sectional elevation of a bolt or screw with an attached torque-limiting nut of the present invention under no axial load.

FIG. 2 is a part sectional elevation showing the nut at full axial load.

FIG. 3 is a top plan view of the preferred embodiment of the nut of the present invention.

FIG. 4 is a side elevation view of a preferred embodiment of the present invention which also shows an alternate configuration in dotted line form.

FIG. 5 is a part sectional elevation of an alternate embodiment of a nut of the present invention under no axial load.

DESCRIPTION OF THE PREFERRED EMBODIMENT

In FIG. 1 the stamped nut member 10 is shown in association with a threaded bolt or screw 24. The preferred embodiment of this nut member 10 includes a cylindrical body 12 having a plurality of arm-like extensions 16 and a plurality of leg-like extensions 18 extending from the bottommost portion of the cylindrical body 12. The nut member 10 may be formed by stamping a sheet material and forming an apertured cylindrical body therein. This cylindrical body 12 is preferably provided with a plurality of internal thread convolutions 14 for maximizing force transmitting contact between the stamped member 10 and its associated bolt member 24. The arm members 16 are located at the lowermost extremity of the cylindrical body 12 and are integrally connected thereto at connection points 35a, b and c as shown in FIG. 3. These arm portions 16 generally extend in a plane which is perpendicular to the axis of the cylindrical body portion 12.

The leg-like portions 18 similarly extend radially of the cylindrical body portion 12 but extend downwardly as well as outwardly of the body portion 12. Attention is drawn to the fact that legs 18 extend at an acute angle to the plane which includes the arm-like portions 16.

Upon inspection of FIGS. 1 and 3, it will be seen that the length of the legs 18 is greater than the length of the arms 16, the purpose for which will become apparent. The preferred embodiment of this invention, as shown in FIGS. 1 and 3 also shows that the legs 18 extend from the bottommost extremity of the cylindrical body portion 12 and are integrally connected thereto at connection points 34a, 34b, and 34c. The outermost extremities of legs 18 are shown to be formed into foot-like portions 22 which flare outwardly and aid in the positive disassociation of driver 28 from the arms 16.

Incidentally, it will be appreciated that the preferred embodiment of the invention provides three legs and three arms which will inherently provide stable contact with a workpiece while at the same time allow the use of a conventional hex socket driver means in the operation of the nut.

Having observed the details of the structure of the invention, attention may now be given to the invention as it is used in association with a conventional driver. This operation may be readily understood upon reference to FIGS. 1 and 2. In FIG. 1 a conventional hex driving tool 28 is shown positioned axially over the nut-bolt combination in such a manner as to operatively contact wrenching surfaces 20 at the extremities of arms 16. The extremities of leg-like portions 18 are shown to provide the initial contact and bearing surface between the nut 10 and the workpiece 26. As turning force is applied to the nut by the driver 28, the nut moves axially downwardly and the legs 18 distend outwardly until a predetermined tension is reached. Since the legs 18 are longer than the arms 16, these arms 16 will eventually reach a plane in which at least the outermost extremities of the spring legs 18 are situated. Thus, it is seen, in FIG. 2, that as the arms 16 approach the plane in which the extremities of the leg portions 18 lie, the driver 28 is forced upwardly out of contact with the wrenching surfaces 20. The nut is now precluded from being driven any further due to the disassociation of the driver with the nut. The nut has also been provided with a predetermined tension as a result of the spring-like, workpiece engaging legs 18.

Another feature of the above described device is the inherent prevailing torque condition which is achieved as the nut is stressed. It will be apparent from FIG. 2 that the bearing force exerted by leg member 18 will result in an equal and opposite force being exerted on the lowermost extremity of the cylindrical body 12. This force will be primarily concentrated at the points of connection 34a, b and c. *This inwardly directed force will provide an increased frictional contact between the fastener 24 and the internal periphery of the cylindrical body 12.*

An alternate embodiment of the invention describes structure which will increase the prevailing torque present in the invention. FIG. 4 shows in dotted line fashion the use of slots 32 which are open at the bottommost extremity of the cylinder and extend longitudinally of the cylindrical shank to an eventual termination point lying above the connection points 34a, b and c and 35 a, b and c. The provision of the slots 32 will facilitate the transfer of the bearing force to the threaded body 24. Thus, structure is present which allows at least portions of the cylindrical body 12 to be forced inwardly as a result of the tension in the spring legs 18. As a consequence, the present invention not only provides for a positive manner of disassociating a driver with a nut, but simultaneously provides a prevailing torque condition which tends to eliminate loosening of the nut as a result of vibrations or the like.

It should be understood that there may be various methods of altering the predetermined tension in the nut 10. For example, the material thickness may be varied or the flexibility of the material itself may be varied to provide different tension properties in the legs 18.

FIG. 5 shows yet another embodiment of the invention in which the spring-like legs 18a are connected to the cylindrical body 12a at positions higher than the connections between the arms 16a and the body 12a. In this configuration, the axial movement of the nut prior to disengagement of the driver is less than that of the nut shown in FIG. 1. This condition results from the fact that the angular arrangement of the legs 18a with the body portion 12a allows the arms 16a to come within a plane including portions of the legs within a relatively short axial distance.

While the invention has been described as including three arms and three legs, it should be understood that a variety of combinations of numbers of arms and legs may be utilized and still come within the scope of this invention. While the invention has been described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

I claim:

1. A rotary nut member comprising a body portion including an aperture adapted to receive an associated threaded fastener, a plurality of wrenching surfaces positioned circumferentially about the body portion and adapted to accept torque from an associated driver means, workpiece engaging spring legs projecting from the body portion and extending downwardly of the body portion, the length of the legs being greater than the radial distance of the wrenching surfaces from the center of the body portion the legs being axially collapsible and including means adjacent the outer extremities thereof adapted to force the associated driver means from operative association with the wrenching surfaces when the nut attains a predetermined tension.

2. A sheet material nut member in accordance with claim 1 which includes a plurality of radially extending arms projecting from the body portion, the free outer extremities of the arms forming said wrenching surfaces, the length of the legs being greater than the length of the arms.

3. A rotary nut member in accordance with claim 2 wherein the body portion includes an axially extending cylindrical shank having a bore with a plurality of threads formed therein.

4. A rotary nut member in accordance with claim 3 wherein the spring legs project from the lower extremity of the body portion, the points of connection of the arms and the legs with the body being substantially coplanar.

5. A rotary nut member in accordance with claim 4 wherein the arms and legs are radially spaced by slot means which extend longitudinally of the cylindrical shank and terminate above the lower extremity of the body portion.

6. A rotary nut member in accordance with claim 3 wherein the points of connection of the legs with the body are positioned above a plane which includes the points of connection of the arms with the body.

7. A rotary nut member in accordance with claim 3 wherein the radially extending arms project in a plane perpendicular to the axis of the nut member.

8. A rotary nut member in accordance with claim 3 wherein the arms and legs are alternately positioned around the body portion.

9. A rotary nut member in accordance with claim 8 wherein there are three arms and three legs.

10. A rotary nut member in accordance with claim 9 wherein the free extremities of the spring legs include outwardly flaring portions to aid in disengaging a driver from the arms.

* * * * *